(12) United States Patent
Li

(10) Patent No.: US 10,884,862 B2
(45) Date of Patent: Jan. 5, 2021

(54) METHOD AND APPARATUS FOR PROCESSING FAILURE OF CIPHER CHANGE OF CIPHERTEXT IN DATABASE

(71) Applicant: ADVANCED NEW TECHNOLOGIES CO., LTD., Grand Cayman (KY)

(72) Inventor: Li Li, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 53 days.

(21) Appl. No.: 16/156,762

(22) Filed: Oct. 10, 2018

(65) Prior Publication Data
US 2019/0042367 A1 Feb. 7, 2019

Related U.S. Application Data

(63) Continuation of application No. PCT/CN2017/078499, filed on Mar. 29, 2017.

(30) Foreign Application Priority Data

Apr. 11, 2016 (CN) .......................... 2016 1 0221942

(51) Int. Cl.
*G06F 11/14* (2006.01)
*G06F 21/64* (2013.01)
(Continued)

(52) U.S. Cl.
CPC ...... *G06F 11/1415* (2013.01); *G06F 11/1402* (2013.01); *G06F 11/1443* (2013.01);
(Continued)

(58) Field of Classification Search
CPC ... G06F 11/14; G06F 11/1415; G06F 11/1402
(Continued)

(56) References Cited

U.S. PATENT DOCUMENTS 4,229,818 A * 10/1980 Matyas ................. H04L 9/0637
380/37
6,108,419 A * 8/2000 LaMacchia ............ H04L 9/004
380/1
(Continued)

FOREIGN PATENT DOCUMENTS

CN 101047978 A 10/2007
CN 101291457 A 10/2008
(Continued)

OTHER PUBLICATIONS

Examination Report for Indonesian Application No. PID201808086 dated Sep. 17, 2019 (4 pages).
(Continued)

*Primary Examiner* — Kamini B Patel

(57) ABSTRACT

A method for processing cipher change failure comprises: storing a record's error information when a cipher change of ciphertext data in the record fails, the error information comprising an identifier of the record and a failure cause; determining a retry strategy based on the stored failure cause; and employing the retry strategy to reperform the cipher change of the ciphertext data in the record having the identifier.

20 Claims, 4 Drawing Sheets

(51) Int. Cl.
  *G06Q 20/24*  (2012.01)
  *G06Q 20/38*  (2012.01)
  *G06Q 20/40*  (2012.01)
  *H04L 9/08*  (2006.01)

(52) U.S. Cl.
  CPC .............. *G06F 21/64* (2013.01); *G06Q 20/24* (2013.01); *G06Q 20/3829* (2013.01); *G06Q 20/4093* (2013.01); *H04L 9/0891* (2013.01); *G06F 2201/805* (2013.01); *G06F 2201/82* (2013.01)

(58) Field of Classification Search
  USPC ......................................................... 714/16
  See application file for complete search history.

(56) References Cited

U.S. PATENT DOCUMENTS

| | | | |
|---|---|---|---|
| 6,523,115 | B1 * | 2/2003 | Ono ..................... H04L 9/0643 |
| | | | 713/168 |
| 7,694,134 | B2 | 4/2010 | Witt et al. |
| 7,987,496 | B2 | 7/2011 | Bryce et al. |
| 8,005,227 | B1 | 8/2011 | Linnell et al. |
| 8,176,158 | B2 * | 5/2012 | DiFalco ............... G06F 16/128 |
| | | | 709/223 |
| 8,281,388 | B1 | 10/2012 | Sobel et al. |
| 8,385,551 | B2 | 2/2013 | Pourzandi et al. |
| 8,423,789 | B1 | 4/2013 | Poo et al. |
| 8,707,082 | B1 | 4/2014 | Chen et al. |
| 8,713,527 | B2 | 4/2014 | Frontiero et al. |
| 9,158,933 | B2 * | 10/2015 | Banks ................... H04L 9/0891 |
| 9,221,079 | B1 | 12/2015 | Daboub et al. |
| 9,230,099 | B1 * | 1/2016 | McCorkendale ....... G06F 21/56 |
| 9,405,920 | B1 * | 8/2016 | Roth ..................... H04L 63/123 |
| 2002/0049911 | A1 | 4/2002 | Kamada et al. |
| 2006/0117178 | A1 | 6/2006 | Miyamoto et al. |
| 2006/0143443 | A1 | 6/2006 | Cohen et al. |
| 2007/0277240 | A1 | 11/2007 | Durfee et al. |
| 2008/0155509 | A1 | 6/2008 | Ohta et al. |
| 2009/0049309 | A1 | 2/2009 | Brinker et al. |
| 2009/0187546 | A1 | 7/2009 | Whyte et al. |
| 2011/0271145 | A1 * | 11/2011 | Silberstein .......... G06F 11/1443 |
| | | | 714/18 |
| 2014/0044259 | A1 | 2/2014 | Funayama |
| 2014/0189426 | A1 | 7/2014 | Ben-Kiki et al. |
| 2014/0223524 | A1 | 8/2014 | Lu et al. |
| 2016/0072621 | A1 * | 3/2016 | Oshida .................. G06F 21/71 |
| | | | 713/194 |
| 2019/0229925 | A1 * | 7/2019 | Kounavis ............. H04L 9/0631 |

FOREIGN PATENT DOCUMENTS

| | | |
|---|---|---|
| CN | 101895846 A | 11/2010 |
| CN | 102315933 A | 1/2012 |
| CN | 102332981 A | 1/2012 |
| CN | 102387500 A | 3/2012 |
| CN | 102413126 A | 4/2012 |
| CN | 104376070 A | 2/2015 |
| CN | 104936308 A | 9/2015 |
| JP | 2008-135004 A | 6/2008 |
| JP | 2009-104445 A | 5/2009 |
| JP | 2010-176303 A | 8/2010 |
| JP | 2011-164907 A | 8/2011 |
| JP | 2015060286 A | 3/2015 |
| JP | 2014-36335 A | 2/2017 |
| KR | 1020150100632 A | 9/2015 |
| TW | 201610907 A | 3/2016 |
| WO | 2007/039453 A1 | 4/2007 |

OTHER PUBLICATIONS

Search Report for European Application No. 17781795.4 dated Oct. 9, 2019 (12 pages).

Liu et al., "A Survey of Payment Card Industry Data Security Standard," IEEE Communications Surveys and Tutorials, Institute of Electrical and Electronics Engineers, vol. 12, No. 3, Jul. 1, 2010 (17 pages).

Brosch, "Integrated Software Architecture-based Reliability Prediction for IT Systems," Karlsruhe Institute of Technology, Jun. 29, 2012, retrieved from: https://d-nb.info/1024312801/34 (221 pages).

Notice of Reasons for Refusal for Japanese Application No. 2019-503610 dated Nov. 5, 2019 with English machine translation (5 pages).

International Search Report and Written Opinion for Application No. PCT/CN2017/078499, dated Jun. 16, 2017, 8 pages.

International Preliminary Report on Patentability Chapter I for PCT Application No. PCT/CN2017/078499 dated Oct. 25, 2018 (10 pages).

First Search for Chinese Application No. 201610221942.1 dated Dec. 24, 2019 (1 page).

Taiwan Office Action and Search Report dated Feb. 20, 2019, issued in related Taiwan Application No. 106107802 (10 pages).

Office Action for Korean Application No. 10-2018-7032659 dated Feb. 27, 2020.

Supplementary Search for Chinese Application No. 201610221942.1 dated Mar. 11, 2020.

Notice of Allowance for Korean Application No. 10-2018-7032659 dated Oct. 20, 2020.

* cited by examiner

METHOD AND APPARATUS FOR PROCESSING FAILURE OF CIPHER CHANGE OF CIPHERTEXT IN DATABASE

CROSS REFERENCE TO RELATED APPLICATIONS

The present application is a continuation application of the International Patent Application No. PCT/CN2017/078499, filed on Mar. 29, 2017, and titled "Method and apparatus for processing failure of cipher change of ciphertext in database." The PCT Application PCT/CN2017/078499 claims priority to the Chinese Patent Application No. 201610221942.1 filed on Apr. 11, 2016. The entire contents of all of the above applications are incorporated herein by reference in their entirety.

TECHNICAL FIELD

This application relates to the field of data processing, and in particular, to a method and an apparatus for processing failure of cipher change of ciphertext in database.

BACKGROUND

The PCI DSS (Payment Card Industry Data Security Standard) has security requirements for all organizations involved with credit card information, including security management, strategies, processes, network architecture, and software design, in order to guarantee as much as possible the security of cardholder transactions. The PCI DSS security standard is considered to be the most authoritative data security measures today, and can ensure the security of sensitive credit card-related information to the highest degree.

Based on the PCI DSS standard, all credit card numbers in the credit card information databases of payment institutions are stored as ciphertext, and the keys used to encrypt card numbers are replaced at least once a year. Therefore, payment institutions must perform a cipher change of the credit card number ciphertext data in their credit card information databases at regular intervals. More specifically, card number plaintext is obtained after the ciphertext data of the card number in each record in the database is decrypted using the old code, and then a new code is used to encrypt the plaintext to obtain new card number ciphertext data. Next, the new ciphertext data is used to replace the ciphertext data in the original record, the key version number of this record is updated to the version number of the new key, and the cipher change time in the record is updated.

In the current technologies, after the cipher change of ciphertext data in a record fails, the identifier of the record and the time of the cipher change failure are output to a failure log. Technicians analyze the failure log and designate one or more retry time frames according to the cipher change time frame of the failed record. For every record with a cipher change time within this designated retry time frame, if the key version number of a record has been updated to a new key version number, the cipher change is not retried; otherwise, the cipher change is reperformed. This failure processing approach requires manual analysis and the designation of retry time frames, and during retries, it is necessary to determine whether a record has undergone a successful cipher change. Its operating efficiency is relatively low.

SUMMARY

According to one aspect, a method for processing cipher change failure comprises: storing a record's error information when a cipher change of ciphertext data in the record fails, the error information comprising an identifier of the record and a failure cause; determining a retry strategy based on the stored failure cause; and employing the retry strategy to reperform the cipher change of the ciphertext data in the record having the identifier.

In some embodiments, the failure cause comprises: a database state anomaly; and the retry strategy comprises: when the failure cause is the database state anomaly, reperforming the cipher change of the ciphertext data in the record for a number of times not exceeding a first predetermined number.

In some embodiments, the cipher change of the ciphertext data is performed by a field value access system on the record's field value in which the ciphertext data is located; and the failure cause comprises: a state anomaly of the field value access system; and the retry strategy comprises: when the failure cause is the state anomaly of the field value access system, reperforming the cipher change of the ciphertext data in the record after a predetermined time has elapsed for a number of times not exceeding a second predetermined number.

In some embodiments, the cipher change of the ciphertext data is performed by the field value access system; the failure cause comprises: an execution anomaly of the cipher change execution system; and the retry strategy comprises: when the failure cause is the execution anomaly of the cipher change execution system, reperforming the cipher change of the ciphertext data in the record for a number of times not exceeding a third predetermined number.

In some embodiments, the method further comprises: not reperforming the cipher change of the ciphertext data in the record having the identifier when the failure cause is a decryption failure of the ciphertext data in the record.

In some embodiments, the method further comprises: after the reperformed cipher change of the ciphertext data in the record having the identifier according to the retry strategy fails, writing the record's error information into a failure log.

In some embodiments, the storing a record's error information comprises: adding the error information of the record with the cipher change failure to a retry processing table, and tagging the error information as unsuccessful; and the determining a retry strategy based on the stored failure cause and the employing the retry strategy to reperform the cipher change of the ciphertext data in the record having the identifier comprise: when predetermined retry conditions are met, reading the error information tagged as unsuccessful in the retry processing table, determining the retry strategy based on the failure cause in the error information, employing the determined retry strategy to reperform the cipher change of the ciphertext data for the record having the identifier, if the cipher change according to the retry strategy is successful, revising the tagging of the error information to successful; and if the cipher change according to the retry strategy is unsuccessful, modifying a retry number for the error information, and when the retry number reaches a maximum number allowed according to the retry strategy, deleting the error information from the retry processing table and writing the error information into a failure log.

In some embodiments, the error information also comprises: an old key version number and a new key version number; and the employing the retry strategy to reperform a cipher change of the ciphertext data in the record having the identifier comprises: employing the retry strategy, and reperforming the cipher change of the ciphertext data in the record having the identifier based on a key corresponding to the old key version number and another key corresponding to the new key version number.

In some embodiments, the ciphertext data comprises: ciphertext data for a credit card number.

According to another aspect, an apparatus for processing cipher change failure comprises a processor and a non-transitory computer-readable storage medium storing instructions that, when executed by the processor, cause the apparatus to perform a method for processing cipher change failure. The method comprises: storing a record's error information when a cipher change of ciphertext data in the record fails, the error information comprising an identifier of the record and a failure cause; determining a retry strategy based on the stored failure cause; and employing the retry strategy to reperform the cipher change of the ciphertext data in the record having the identifier.

According to another aspect, an non-transitory computer-readable storage medium storing instructions that, when executed by a processor, cause the processor to perform a method for processing cipher change failure. The method comprises: storing a record's error information when a cipher change of ciphertext data in the record fails, the error information comprising an identifier of the record and a failure cause; determining a retry strategy based on the stored failure cause; and employing the retry strategy to reperform the cipher change of the ciphertext data in the record having the identifier.

According to another aspect, an apparatus for processing a failure of a cipher change of ciphertext data in a database comprises: an error information storage unit, configured to store the record's error information when a cipher change of ciphertext data in a record fails, the error information comprising an identifier of the record and a failure cause; a strategy unit, configured to determine a retry strategy based on the stored failure cause; and a retry unit, configured to employ the retry strategy to reperform the cipher change of the ciphertext data in the record having the identifier.

According to the above technical scheme, in the embodiments of this disclosure, after a cipher change failure for ciphertext data in a database record, the retry strategy for the record is determined based on the failure cause, and a cipher change of the ciphertext data in the failed record is automatically reperformed in accordance with the retry strategy. Targeted retry strategies can vastly boost the success rate of cipher re-changing and greatly reduce the amount of manual work; at the same time, because retries are only performed for failed records, the operating efficiency of failure processing is improved.

DETAILED DESCRIPTION

The embodiments of this disclosure disclose methods for processing cipher change failures of ciphertext data in a database, storing the causes of the database record cipher change failures, and determining retry strategies in accordance with the failure causes, to automatically reperform cipher changes of the ciphertext data in the failed records. Accordingly, it is not necessary to process the records with successful cipher changes during retries, and it can vastly increase the retry success probability and improve the execution efficiency of failure processing. In addition, the automatic reperformance of cipher changes can reduce the amount of manual work. All of these addresses problems existing in the current technologies.

The embodiments of this disclosure can be applied to any device with computing and storage capabilities, e.g., mobile phones, tablet computers, PCs (personal computers), laptops, servers, and virtual machines. The device used in an embodiment of this disclosure can be a physical or logical device, or two or more physical or logical devices sharing different duties, coordinating with each other to achieve the various functions in the embodiments of this disclosure.

Figure 1:
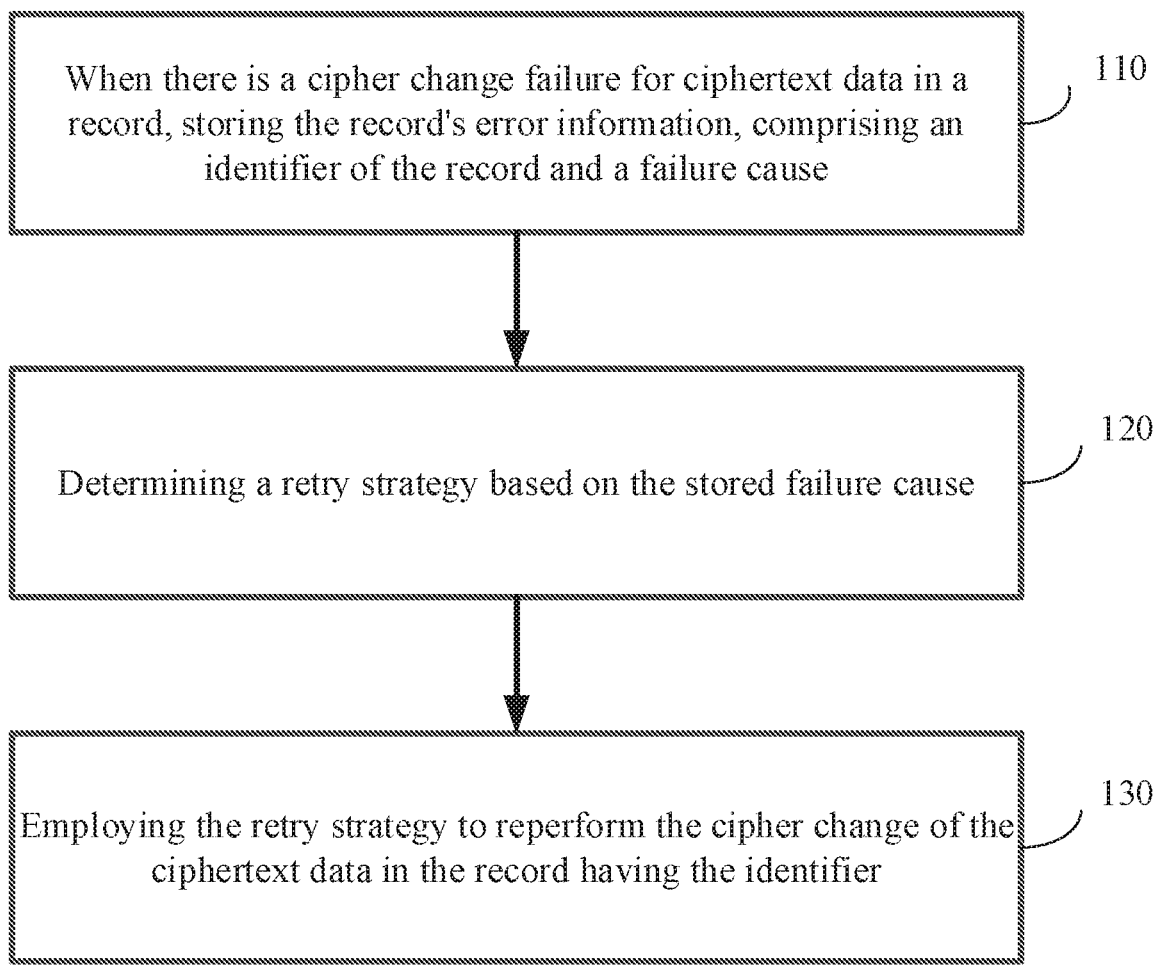
FIG. 1 is a flow chart of a method for processing a failure of a cipher change of ciphertext data in a database according to various embodiments of this disclosure.

In the embodiments of this disclosure, the flow of the method for processing a failure of a cipher change of ciphertext data in a database is as shown in FIG. 1.

Step 110, when there is a cipher change failure for ciphertext data in a record, storing the record's error information, comprising an identifier of the record and a failure cause.

In a database, data is usually stored in tables. A column in a table is called a field, and a row in a table is called a record. Each record comprises one or more field values corresponding to the table's columns. Data is stored in the tables of a database using records as units, and operations such as reading, writing, and updating data in the tables is usually carried out in terms of records.

In the embodiments of this disclosure, a record in a database can have one or more field values that are ciphertext data, and different field values can employ the same or different keys. No limit is prescribed. If there is a cipher change failure for the ciphertext data of a record, error information comprising the identifier of the record and failure cause is stored.

The record's identifier is used to uniquely ascertain a record within the range of all stored error information. For example, if storing the cipher change error information for a database table, the record's identifier can be the primary key or unique index of the database table, or can be a combination of the primary key or unique index and another field. As another example, if storing the cipher change error information for multiple database tables, because the primary keys or unique indexes of different tables may be repeated, a combination of the table name and primary key or unique index can be used as the record's identifier. Here, the primary key is one or more fields of a database table, and the primary key value of any given record in this table will be different from the primary key values of the other records. The unique index is a structure for sorting the values of one or more fields in a database table, and the unique index values of different records will be different from each other. The unique index is used for rapidly querying and indexing field values.

The cipher change of ciphertext data in a record may fail for a variety of reasons. For example, the cause of the failure can be located through hardware or software anomalies at the time of the fault leading to the failure. The cause of the failure can be ascertained by reading logs containing fault and warning information, and the cause of the failure can be recorded in the error information of the record.

In different application scenarios, the cause of a failed cipher change of the ciphertext data is highly correlated to the scenario's specific implementation. For example, in the embodiments of this disclosure, if the cipher changes of the ciphertext data and failure processing operates on the same physical device as the database, failure causes may comprise operational faults in the cipher change and failure processing components, database read/write anomalies, etc. In the embodiments of this disclosure, if the cipher changes of the ciphertext data and failure processing operates on a different physical device from the database, in addition to operational faults in the cipher change and failure processing components and database read/write anomalies, failure causes may also comprise communication anomalies between the two physical devices. The embodiments of this disclosure place no limitations on the specific types of failure causes.

Step 120, determining a retry strategy based on the stored failure cause; and Step 130, employing the retry strategy to reperform the cipher change of the ciphertext data in the record having the identifier.

Some cipher change failures are the result of transient anomalies during the operating process. After the transient anomaly ends, during operation, it is possible to succeed with a cipher change through retries. There may be different recovery conditions required for different transient anomalies. Therefore, retry strategies corresponding to different failure causes can be set, to try to automatically reperform cipher changes for records with cipher change failures, improving the cipher change success rate without requiring manual intervention. Retry strategy can comprise the conditions under which a retry is performed, the mode by which a retry is performed, the parameters employed in performing a retry, the number of retries performed, etc.

As previously described, failure causes vary due to difference in application scenarios and differences in specific implementations. Ideally, retry strategies aimed at specific failure causes will meet the needs of the application scenario and specific implementation. The embodiments of this disclosure place no limitations on the failure causes and retry strategies. A description using several examples is given below.

For example, failure causes usually comprise database state anomalies, and database state anomalies can comprise database inaccessibility, database jitter, and database read/write errors. The duration of self-recoverable database anomalies is usually very brief. Therefore, when the cause of a failed cipher change of the ciphertext data is a database state anomaly, the retry strategy can be to immediately reperform the cipher change of the ciphertext data in the record change, for a number of times not exceeding a first predetermined number.

As another example, in one mode of implementation, the cipher change of ciphertext data in a database is performed by a field value access component that is invoked by a cipher change execution component. Here, the field value access component performs operations on the record's field value in which the ciphertext data is located. After the cipher change execution component receives a cipher change task for the ciphertext data of a database record, the cipher change execution component employs pre-set parameters to invoke the field value access component to carry out the cipher change task. The field value access component or cipher change execution component can be an independently running program or application, or can be one part of a program or application. The field value access component and cipher change execution component can run on the same or different physical or logical devices.

In this mode of implementation, state anomalies of the field value access component can be one type of failure cause. State anomalies of the field value access component may comprise operational faults of the field value access component itself and faults when the field value access component is invoked. Fault recovery in a field value access component usually takes a certain amount of time. Therefore the retry strategy can be: after a predetermined time has elapsed, reperforming the cipher change of the ciphertext data in the record for which the failure cause is a state anomaly of the field value access component, for a number of times not exceeding a second predetermined number. The time of the cipher change failure can be written into the error information of the failed record, in order to determine the time at which a retry can be performed, based on the time of the cipher change failure and the predetermined time.

In this mode of implementation, state anomalies of the cipher change execution component can also be a type of failure cause. State anomalies of the cipher change execution component may comprise operational faults of the cipher change execution component itself and communication faults. When the failure cause is the execution anomaly of the cipher change execution component, the retry strategy can be: immediately reperforming the cipher change of the ciphertext data in the record, for a number of times not exceeding a third predetermined number.

In the preceding examples, suitable values for the first predetermined number, second predetermined number, and/or third predetermined number are related to the application scenario and the current service operation situation. First, the values can be set to be a given value based on experience; later, the set values can be adjusted based on factors such as the system's operating conditions and the retry success rate. If there are changes in the factors influencing system operation, such as the application scenario's hardware or software, or the operational load or operation flow, this adjustment process can be repeated, to obtain suitable values for the first predetermined number, second predetermined number, and/or third predetermined number.

Correspondence relationships between failure causes and retry strategies for those failure causes can be set in advance. Based on a record's failure cause, the corresponding retry strategy can be looked up, and this retry strategy can be employed to reperform the cipher change for the record. If the reperformance of a cipher change for a record, in accordance with the record's retry strategy, still ends in failure, the record's error information can be written into a failure log, for manual analysis, intervention, or other processing.

In one mode of implementation, a special retry component can be employed to reperform the cipher change for a failed record. The operational logic of the retry component can be implemented based on the needs of the application scenario. In one example, a retry processing table can be maintained. When there is a cipher change failure for the ciphertext data of a record, the error information for this record is added to the retry processing table, and tagged as unsuccessful. When predetermined retry conditions are met, the retry component reads the error information tagged as unsuccessful in the retry processing table and obtains the record identifier and failure cause in the error information. In accordance with the retry strategy determined by the failure cause, the retry component reperforms the cipher change of the ciphertext data of the database record having this identifier. If the reperformed cipher change is successful, the tag for this error information is changed to successful. If the reperformed cipher change fails, the error information's retry number is changed. If the retry number of this error information has reached the maximum number allowed according to the retry strategy, the error information is deleted from the retry processing table, and the error information is written into a failure log.

The parameters required when reperforming the cipher change of ciphertext data in a database record can be written into the error information of a failed record. The specific parameters are determined based on the application scenario. For example, the error information of a failed record can comprise an old key version number and a new key version number. When reperforming the cipher change of ciphertext data in a failed record, based on the determined retry strategy, the original ciphertext data can be decrypted using the key corresponding to the old key version number to obtain plaintext data, and the plaintext data can be encrypted using the key corresponding to the new key version number, yielding new ciphertext data. The new ciphertext data can be used to replace the original ciphertext data in the failed record.

For cipher change failures that are not the result of transient anomalies during operation, it is usually difficult to perform a successful cipher change through retries. For example, if the failure cause is a decryption failure of the record's ciphertext data, this ciphertext data has already been stored in the database, and it is not possible to solve this error through retries. Under these circumstances, an automatic retry is not performed for this record. The record's error information, such as its identifier, can be written into the failure log for manual processing.

In the embodiments of this disclosure, after a cipher change failure for ciphertext data in a database record, the record's failure cause is stored, and a cipher change of the ciphertext data in the failed record is automatically reperformed in accordance with the retry strategy determined by the failure cause. Thus, the success rate of automatic cipher changes is boosted, and the amount of manual work is reduced. In addition, because it is not necessary to process records having completed cipher changes when reperforming cipher changes, the operating efficiency of failure processing is improved.

In an application example of this disclosure, the credit card number ciphertext data in a credit card information database needs to undergo cipher changes at regular intervals. When the cipher change cycle ends, a change task execution system (that is, an example of a cipher change execution component) receives a cipher change task and cipher change parameters used for this task, comprising an old key version number and a new key version number. The change task execution system can use the old key version number and new key version number to obtain the old key and the new key. The cipher change execution component may also be referred to as a cipher change execution system. The cipher change execution system may comprises software (e.g., instructions) and/or hardware (e.g., circuitry) for performing various steps. For example, the cipher change execution system may comprises a processor and a non-transitory computer-readable storage medium storing instructions that, when executed by the processor, cause the cipher change execution system to perform various steps described herein.

Each record in the credit card information database corresponds to a credit card, with fields comprising a card index number, card number ciphertext data, and a key version number for card number encryption. Here, the card index number is used to uniquely represent a credit card in the credit card information database. In this application example, the card index number serves as the record's identifier.

Figure 2:
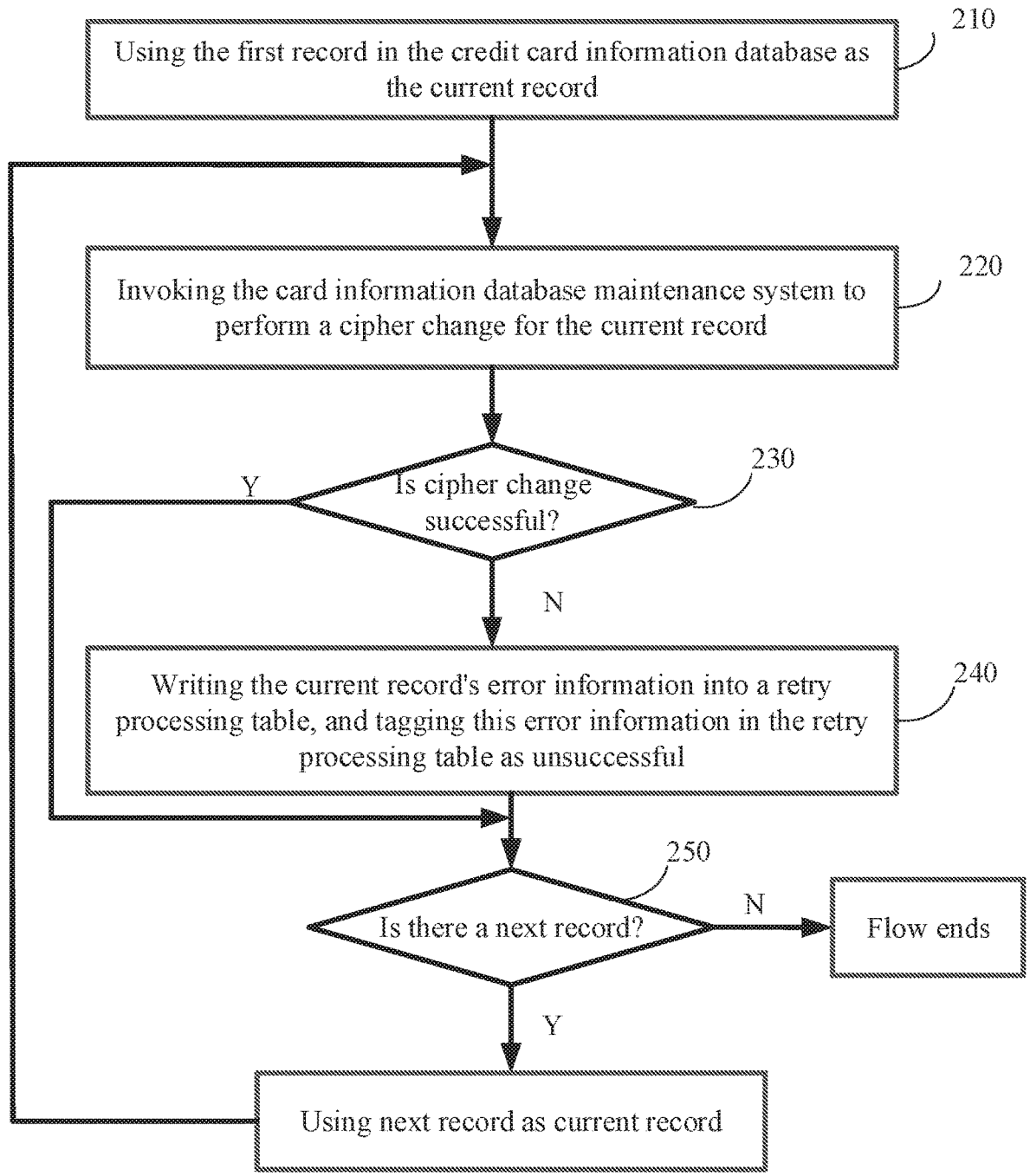
FIG. 2 is a flow chart of the cipher change of a change task execution system according to various embodiments of this disclosure.

The change task execution system accesses the credit card information database by invoking a card information database maintenance system (that is, an example of a field value access component), and performs cipher changes of the card number ciphertext in each of the records. The field value access component may also be referred to as a field value access system. The field value access system may comprises software (e.g., instructions) and/or hardware (e.g., circuitry) for performing various steps. For example, the field value access system may comprises a processor and a non-transitory computer-readable storage medium storing instructions that, when executed by the processor, cause the field value access system to perform various steps described herein. The flow for the cipher changes of the card number ciphertext in each of the records is as shown in FIG. 2.

Step 210, using the first record in the credit card information database as the current record.

Step 220, invoking the card information database maintenance system to perform a cipher change for the current record.

Step 230, determining whether the cipher change for the current record was successful; executing Step 240 if it failed, and proceeding to Step 250 if it was successful.

Step 240, using the current record's card index number, failure cause, cipher change execution time, old key version number, and new key version number as error information, writing it into a retry processing table, and tagging this error information in the retry processing table as unsuccessful.

Step 250, determining whether there is a next record in the credit card information database; if so, using the next record as the current record and going to Step 220; if not, ending the cipher change flow.

Cipher change failure causes may comprise the following four types:

First type: card information database maintenance system state anomaly; the corresponding retry strategy is: retrying 1 hour after the cipher change execution time, with a maximum of 5 retries permitted;

Second type: credit card information database state anomaly; the corresponding retry strategy is: immediately retry, with a maximum of 2 retries permitted;

Third type: change task execution system state anomaly; the corresponding retry strategy is: immediately retry, with a maximum of 2 retries permitted;

Fourth type: ciphertext data decryption failure, i.e., it is not possible to use the old key to decrypt the record's card number ciphertext data as plaintext data conforming to the card number data format; no automatic retry is performed, and the error information is output to a failure log.

Figure 3:
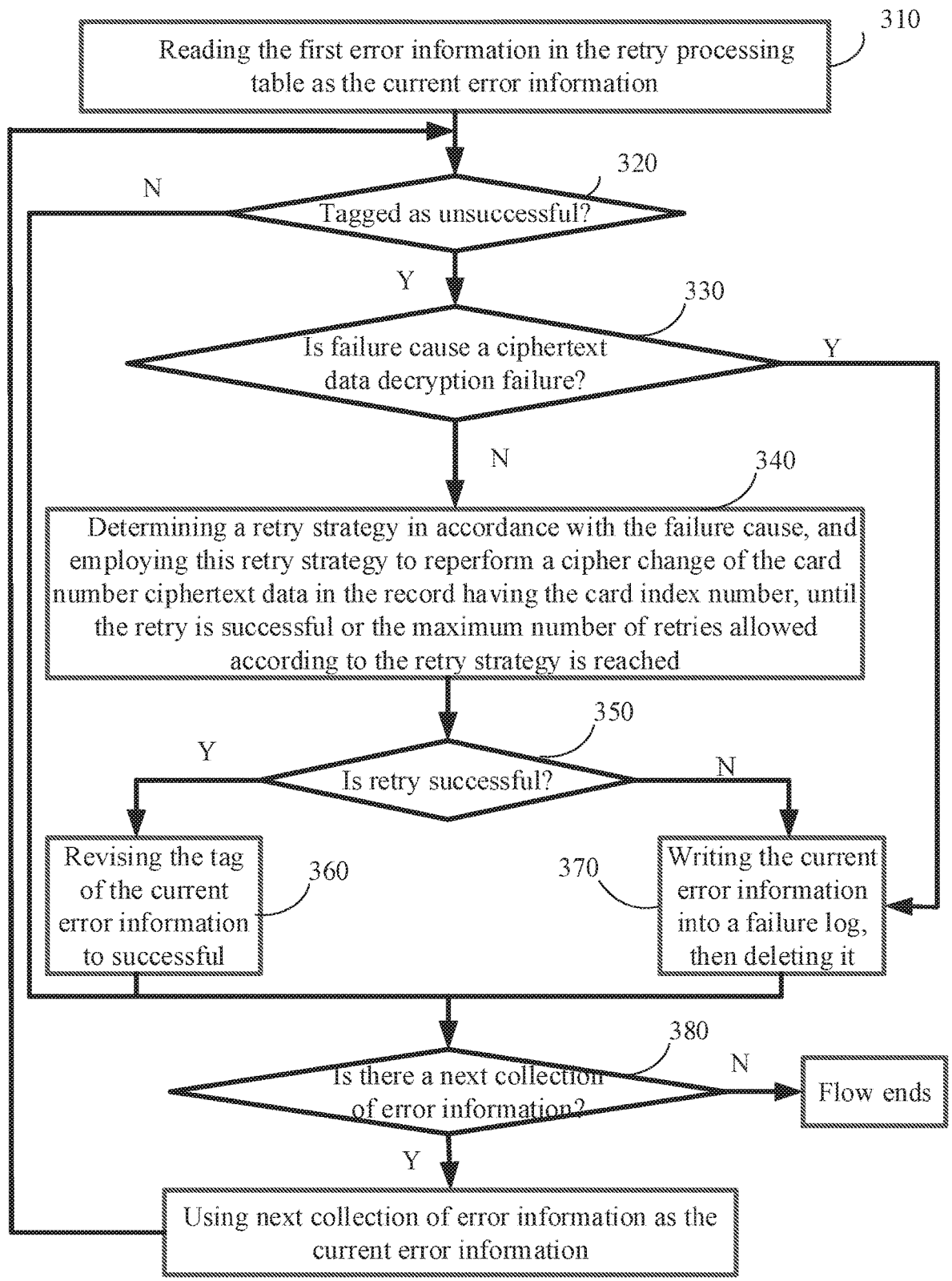
FIG. 3 is a flow chart of failed record retries by a change task execution system according to various embodiments of this disclosure.

The change task execution system regularly performs automatic retries for failed records in accordance with the error information stored in the retry processing table. The flow is as shown in FIG. 3.

Step 310, reading the first error information in the retry processing table as the current error information.

Step 320, determining whether the current error information is tagged as unsuccessful; if so, executing Step 330, and if not, proceeding to Step 380.

Step 330, determining whether the failure cause in the current error information is a ciphertext data decryption failure; if so, proceeding to Step 370.

Step 340, determining a retry strategy in accordance with the failure cause in the error information, and employing this retry strategy to invoke the card information database maintenance system to reperform the cipher change of the card number ciphertext data in the record having the card index number in the current error information, until the retry is successful or the maximum number of retries allowed according to the retry strategy is reached.

Step 350, determining whether the current error information is a retry success; if so, executing Step 360, and if not, proceeding to Step 370.

Step 360, changing the tag of the current error information in the retry processing table to successful, and proceeding to Step 380.

Step 370, writing the current error information into a failure log, and deleting the current error information from the retry processing table.

Step 380, determining whether there is a next collection of error information in the retry processing table; if so, using the next collection of error information as the current error information and going to Step 320; if not, ending the automatic retry flow.

In some embodiments, the storing a record's error information comprises: adding the error information of the record with the cipher change failure to a retry processing table, and tagging the error information as unsuccessful; and the determining a retry strategy based on the stored failure cause and the employing the retry strategy to reperform the cipher change of the ciphertext data in the record having the identifier comprise: when predetermined retry conditions are met, reading the error information tagged as unsuccessful in the retry processing table, determining the retry strategy based on the failure cause in the error information, employing the determined retry strategy to reperform the cipher change of the ciphertext data for the record having the identifier, if the cipher change according to the retry strategy is successful revising the tagging of the error information to successful; and if the cipher change according to the retry strategy is unsuccessful, modifying a retry number for the error information, and when the retry number reaches a maximum number allowed according to the retry strategy, deleting the error information from the retry processing table and writing the error information into a failure log.

Figure 4:
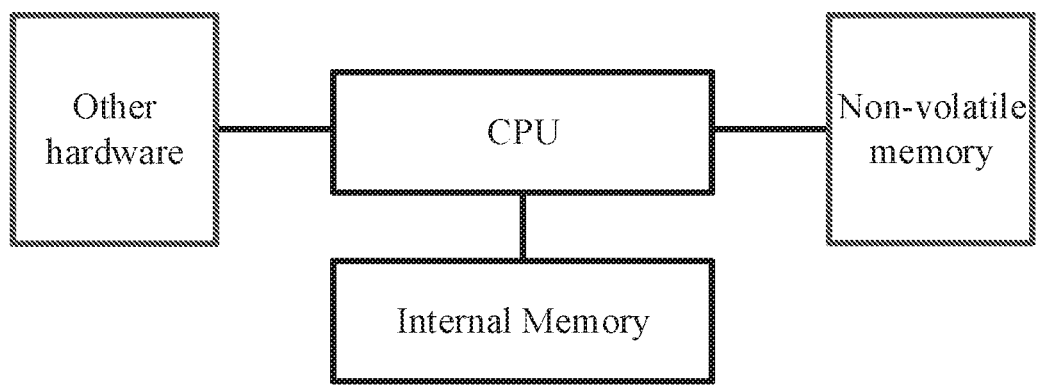
FIG. 4 is a hardware structure diagram of the devices according to various embodiments of this disclosure.

Corresponding to the implementation of the flows described above, the embodiments of this disclosure also provide an apparatus for processing a failure of a cipher change of ciphertext data in a database. This apparatus can be implemented through software, and it can also be implemented through hardware or a combination of software and hardware. Using software implementation as an example, as a logical apparatus, it is run by having the CPU (Central Processing Unit) of the device in which it is located to read corresponding computer program instructions to internal memory. As for hardware, in addition to the CPU, internal memory, and non-volatile memory shown in FIG. 4, the device in which the apparatus for processing a failure of a cipher change of ciphertext data in a database is located usually also comprises other hardware such as a chip used to perform wireless signal transmission and reception, and/or other hardware such as a card used for network communications.

Figure 5:
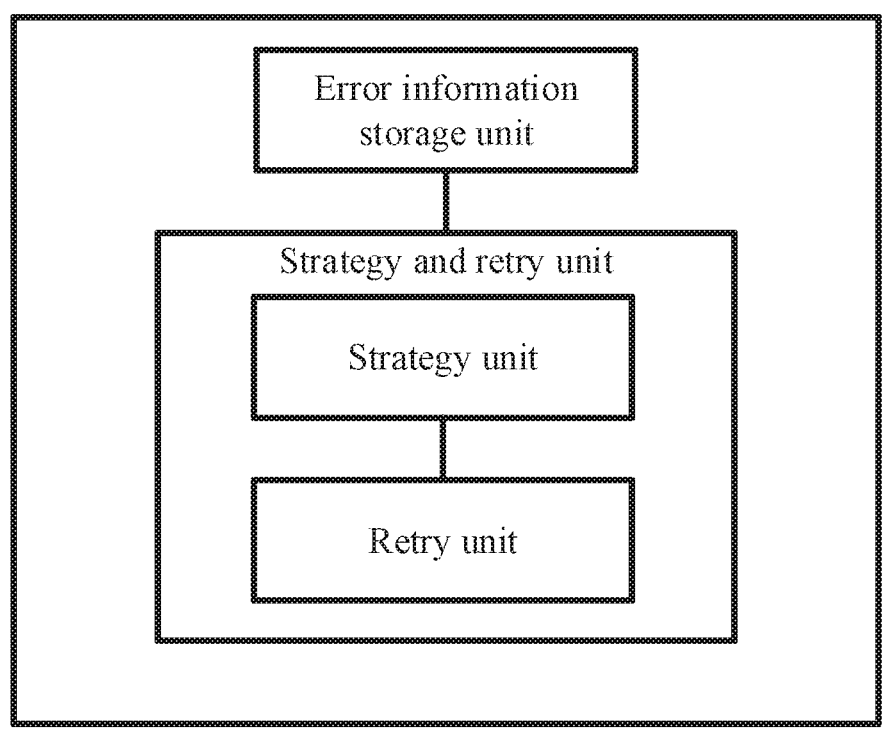
FIG. 5 is a logic structure diagram of an apparatus for processing a failure of a cipher change of ciphertext data in a database according to various embodiments of this disclosure.

FIG. 5 shows the apparatus for processing a failure of a cipher change of ciphertext data in a database provided by the embodiments of this disclosure, comprising an error information storage unit and a strategy and retry unit. The strategy and retry unit may comprise a strategy unit and a retry unit. The error information storage unit is configured to store the record's error information when a cipher change of ciphertext data in a record fails, the error information comprising an identifier of the record and a failure cause; the strategy unit is configured to determine a retry strategy based on the stored failure cause; and the retry unit is configured to employ the retry strategy to reperform the cipher change of the ciphertext data in the record having the identifier.

Optionally, the failure cause comprises: a database state anomaly; the strategy and retry unit determining a retry strategy based on the stored failure cause comprises: a retry strategy of, when the failure cause is the database state anomaly, immediately reperforming the cipher change of the ciphertext data in the record for a number of times not exceeding a first predetermined number.

In one example, the cipher change of the ciphertext data is performed by a field value access component on the record's field value in which the ciphertext data is located; and the failure cause comprises: a state anomaly of the field value access component; the strategy and retry unit determining a retry strategy based on the stored failure cause comprises: a retry strategy of, when the failure cause is the state anomaly of the field value access component, reperforming the cipher change of the ciphertext data in the record after a predetermined time has elapsed for a number of times not exceeding a second predetermined number.

In this example, during the cipher change of the ciphertext data, the cipher change execution component invokes the field value access component; the failure cause comprises: an execution anomaly of the cipher change execution component; the strategy and retry unit determining a retry strategy based on the stored failure cause comprises: a retry strategy of immediately reperforming the cipher change of the ciphertext data in the record when the failure cause is the execution anomaly of the cipher change execution component, for a number of times not exceeding a third predetermined number.

Optionally, the apparatus also comprises a retry cancellation unit, configured to not reperform the cipher change of the ciphertext data in the record having the identifier when the failure cause is a decryption failure of the ciphertext data in the record.

Optionally, the apparatus also comprises a retry failure unit, configured to write the record's error information into a failure log after the reperformed cipher change of the ciphertext data in the record having the identifier according to the retry strategy fails.

Optionally, the error information storage unit is configured to: when there is a cipher change failure for ciphertext data in a record, add the error information of the record with the cipher change failure to a retry processing table, and tag the error information as unsuccessful; the strategy and retry unit is configured to: when predetermined retry conditions are met, read the error information tagged as unsuccessful in the retry processing table, determine the retry strategy based on the failure cause in the error information, employ the determined retry strategy to reperform the cipher change of the ciphertext data for the record having the identifier, and revise the tag of the error information to successful if the cipher change is successful; otherwise, the error information storage unit is configured to modify a retry number for the error information, and when the retry number reaches a maximum number allowed according to the retry strategy, delete the error information from the retry processing table and write the error information into a failure log.

Optionally, the error information also comprises: an old key version number and a new key version number; the strategy and retry unit employing the retry strategy to reperform the cipher change of the ciphertext data for the record having the identifier comprises: employing the retry strategy, and reperforming the cipher change of the ciphertext data in the record having the identifier based on a key corresponding to the old key version number and another key corresponding to the new key version number.

Optionally, the ciphertext data comprises: ciphertext data for a credit card number.

All modifications, equivalent substitutions, and improvements made within the spirit and principles of this disclosure shall fall within the scope of protection of this disclosure.

In some embodiments, the various modules and units of the apparatus for processing a failure of a cipher change of ciphertext data in a database may be implemented as software instructions (or hardware components, or a combination of software and hardware). The apparatus for processing a failure of a cipher change of ciphertext data in a database may be referred to as a system for processing a failure of a cipher change of ciphertext data in a database That is, the apparatus for processing a failure of a cipher change of ciphertext data in a database described with reference to FIG. 5 may comprise a processor and a non-transitory computer-readable storage medium storing instructions that, when executed by the processor, cause one or more components (e.g., the processor) of the second server to perform various steps and methods of the modules and units described above. The apparatus for processing a failure of a cipher change of ciphertext data in a database may comprise, for example, a server, a computer, etc.

In one typical configuration, the apparatus for processing a failure of a cipher change of ciphertext data in a database comprises one or more processors (CPUs), input/output interfaces, network interfaces, and internal memory.

The internal memory may comprise the forms of volatile memory on computer-readable media, random access memory (RAM), and/or non-volatile RAM, such as read-only memory (ROM) or flash RAM. Internal memory is an example of computer-readable media.

Computer-readable media may include permanent, non-permanent, mobile, and immobile media, which can achieve information storage through any method or technology. The information may be computer-readable instructions, data structures, program modules, or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVD) or other optical memories, cassettes, magnetic tape and disk memories or other magnetic memory devices, or any other non-transmission media, which can be used for storing information that can be accessed by a computation device. According to the definitions herein, computer-readable media exclude transitory computer-readable media (transitory media), such as modulated data signals and carriers.

The terms "comprise" and "include" or any variations thereof are intended as non-exclusive inclusion. Thus, a process, method, product, or device comprising a series of elements does not comprise these elements only. It also comprises other elements not explicitly listed, or it also comprises elements inherent to that process, method, product, or device. When there are no other limitations, an element defined by the phrasing "comprising a . . . " does not exclude the presence of other similar elements in the process, method, product, or device comprising the element.

A person skilled in the art should understand that the embodiments of this disclosure can be provided as methods, systems, or computer program products. Therefore, the embodiments of this disclosure may employ a purely hardware embodiment form, purely software embodiment form, or an embodiment form that combines software and hardware. Also, the embodiments of this disclosure may employ the form of computer program products through one or more computer storage media (including but not limited to magnetic disc memory, CD-ROM, and optical memory) comprising computer-executable program code.

The invention claimed is:

1. A method for processing cipher change failure, comprising:
    storing a record's error information when a cipher change of ciphertext data in the record fails, the error information comprising an identifier of the record, a failure cause, an old key version number, and a new key version number;
    determining a retry strategy based on the stored failure cause, the determining a retry strategy comprising determining whether to implement an automatic retry or a manual retry based on whether the failure cause comprises at least one of: database inaccessibility, database jitter, database read/write errors, a state anomaly of a field value access system that performs the cipher change, or an execution anomaly of a cipher change execution component that calls the field value access system; and
    employing the retry strategy to reperform the cipher change of the ciphertext data in the record having the identifier by decrypting the ciphertext data with a key corresponding to the old key version number to obtain plaintext data, and encrypting the obtained plaintext data using a key corresponding to the new key version number.

2. The method according to claim 1, wherein: the retry strategy comprises reperforming the cipher change of the ciphertext data in the record for a number of times not exceeding a first predetermined number when the failure cause comprises at least one of database inaccessibility, database jitter, or database read/write errors.

3. The method according to claim 1, wherein: the cipher change of the ciphertext data is performed on the record's field value in which the ciphertext data is located; and
    the retry strategy comprises: when the failure cause comprises the state anomaly of the field value access system, reperforming the cipher change of the ciphertext data in the record after a predetermined time has elapsed for a number of times not exceeding a second predetermined number.

4. The method according to claim 1, wherein the retry strategy comprises:
    when the failure cause comprises the execution anomaly of the cipher change execution component, reperforming the cipher change of a ciphertext data in the record for a number of times not exceeding a third predetermined number.

5. The method according to claim 1, further comprising: not reperforming the cipher change of the ciphertext data in the record having the identifier when the failure cause is a decryption failure of the ciphertext data in the record.

6. The method according to claim 1, further comprising: after the reperformed cipher change of the ciphertext data in the record having the identifier according to the retry strategy fails, writing the record's error information into a failure log.

7. The method according to claim 1, wherein the storing the record's error information comprises: adding the error information of the record with the cipher change failure to a retry processing table, and tagging the error information as unsuccessful; and the determining a retry strategy based on the stored failure cause and the employing the retry strategy to reperform the cipher change of the ciphertext data in the record having the identifier comprise: when predetermined retry conditions are met, reading the error information tagged as unsuccessful in the retry processing table, determining the retry strategy based on the failure cause in the error information, employing the determined retry strategy to reperform the cipher change of the ciphertext data for the record having the identifier, if the cipher change according to the retry strategy is successful, revising the tagging of the error information to successful; and if the cipher change according to the retry strategy is unsuccessful, modifying a retry number for the error information, and when the retry number reaches a maximum number allowed according to the retry strategy, deleting the error information from the retry processing table and writing the error information into a failure log.

8. The method according to claim 1, wherein the employing the retry strategy to reperform the cipher change comprises
reperforming the cipher change of the ciphertext data in the record for a number of times not exceeding a first predetermined number, the first predetermined number based on a current operational load and a success rate of the automatic retry.

9. The method according to claim 1, wherein the ciphertext data comprises: ciphertext data for a credit card number.

10. An apparatus for processing cipher change failure, the apparatus comprising a processor and a non-transitory computer-readable storage medium storing instructions that, when executed by the processor, cause the apparatus to perform operations comprising:

storing a record's error information when a cipher change of ciphertext data in the record fails, the error information comprising an identifier of the record, a failure cause, an old key version number, and a new key version number;

determining a retry strategy based on the stored failure cause, the determining a retry strategy comprising determining whether to implement an automatic retry or a manual retry based on whether the failure cause comprises at least one of: database inaccessibility, database jitter, database read/write errors, a state anomaly of a field value access system that performs the cipher change, or an execution anomaly of a cipher change execution component that calls the field value access system; and employing the retry strategy to reperform the cipher change of the ciphertext data in the record having the identifier by decrypting the ciphertext data with a key corresponding to the old key version number to obtain plaintext data, and encrypting the obtained plaintext data using a key corresponding to the new key version number.

11. The apparatus according to claim 10, wherein: the retry strategy comprises reperforming the cipher change of the ciphertext data in the record for a number of times not exceeding a first predetermined number when the failure cause comprises at least one of database inaccessibility, database jitter, or database read/write errors.

12. The apparatus according to claim 10, wherein: the cipher change of the ciphertext data is performed on the record's field value in which the ciphertext data is located; and the retry strategy comprises: when the failure cause comprises the state anomaly of the field value access system, reperforming the cipher change of the ciphertext data in the record after a predetermined time has elapsed for a number of times not exceeding a second predetermined number.

13. The apparatus according to claim 10, wherein: the retry strategy comprises:

when the failure cause comprises the execution anomaly of the cipher change execution component, reperforming the cipher change of a ciphertext data in the record for a number of times not exceeding a third predetermined number.

14. The apparatus according to claim 10, wherein the operations further comprise: not reperforming the cipher change of the ciphertext data in the record having the identifier when the failure cause is a decryption failure of the ciphertext data in the record.

15. The apparatus according to claim 10, wherein the operations further comprise: after the reperformed cipher change of the ciphertext data in the record having the identifier according to the retry strategy fails, writing the record's error information into a failure log.

16. The apparatus according to claim 10, wherein the storing the record's error information comprises: adding the error information of the record with the cipher change failure to a retry processing table, and tagging the error information as unsuccessful; and the determining a retry strategy based on the stored failure cause and the employing the retry strategy to reperform the cipher change of the ciphertext data in the record having the identifier comprise: when predetermined retry conditions are met, reading the error information tagged as unsuccessful in the retry processing table, determining the retry strategy based on the failure cause in the error information, employing the determined retry strategy to reperform the cipher change of the ciphertext data for the record having the identifier, if the cipher change according to the retry strategy is successful, revising the tagging of the error information to successful if the cipher change is successful; and if the cipher change according to the retry strategy is unsuccessful, modifying a retry number for the error information, and when the retry number reaches a maximum number allowed according to the retry strategy, deleting the error information from the retry processing table and writing the error information into a failure log.

17. The apparatus according to claim 10, wherein the employing the retry strategy to reperform the cipher change comprises
reperforming the cipher change of the ciphertext data in the record for a number of times not exceeding a first predetermined number, the first predetermined number based on a current operational load and a success rate of the automatic retry.

18. The apparatus according to claim 10, wherein the ciphertext data comprises: ciphertext data for a credit card number.

19. A non-transitory computer-readable storage medium storing instructions that, when executed by a processor, cause the processor to perform operations comprising:
  storing a record's error information when a cipher change of ciphertext data in the record fails, the error information comprising an identifier of the record, a failure cause, an old key version number, and a new key version number;
  determining a retry strategy based on the stored failure cause, the determining a retry strategy comprising determining whether to implement an automatic retry or a manual retry based on whether the failure cause comprises at least one of: database inaccessibility, database jitter, database read/write errors, a state anomaly of a field value access system that performs the cipher change, or an execution anomaly of a cipher change execution component that calls the field value access system; and
  employing the retry strategy to reperform the cipher change of the ciphertext data in the record having the identifier by decrypting the ciphertext data with a key corresponding to the old key version number to obtain plaintext data, and encrypting the obtained plaintext data using a key corresponding to the new key version number.

20. The storage medium according to claim 19, wherein: the retry strategy comprises reperforming the cipher change of the ciphertext data in the record for a number of times not exceeding a first predetermined number when the failure cause comprises at least one of database inaccessibility, database jitter, or database read/write errors.

* * * * *